UNITED STATES PATENT OFFICE.

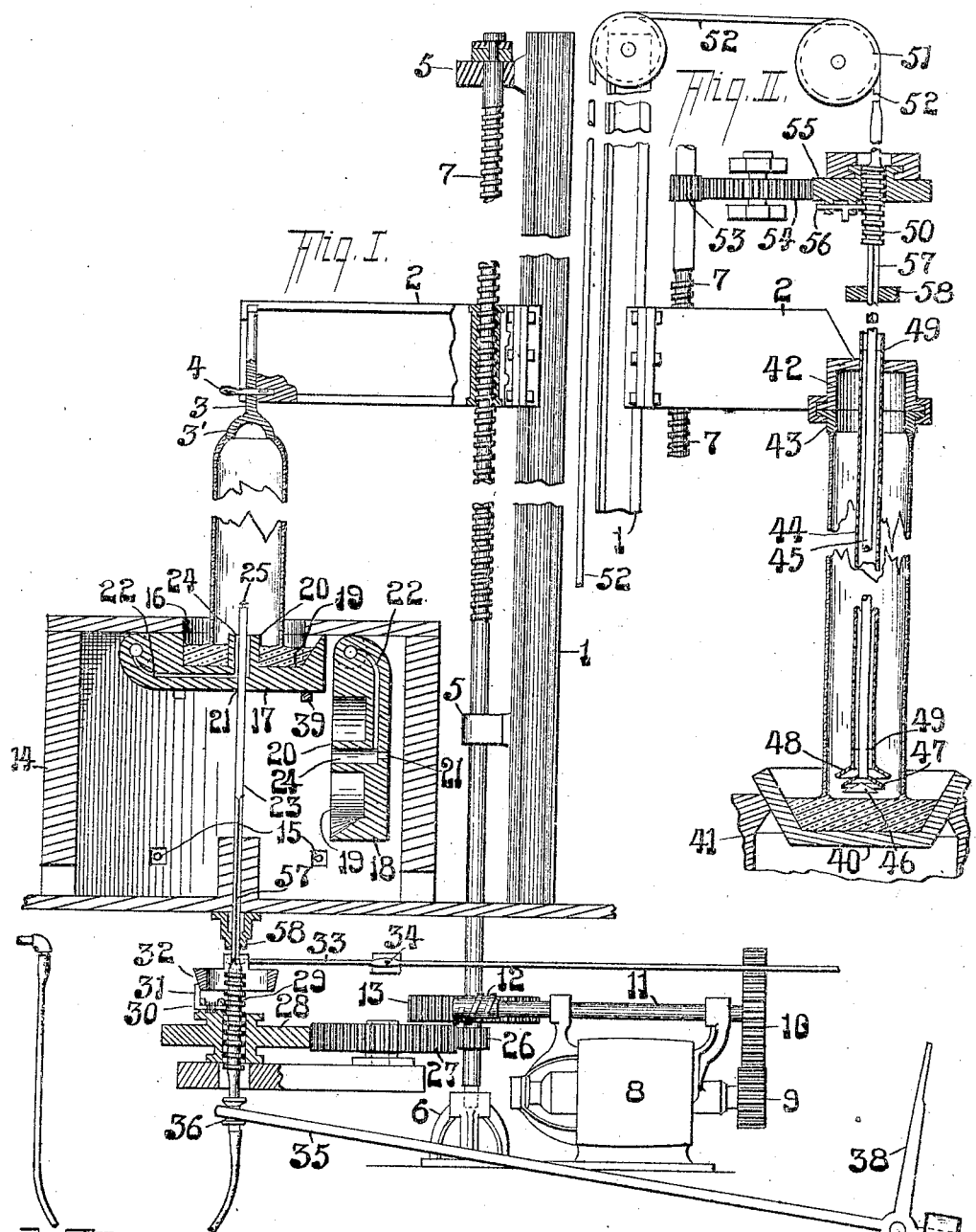

JAMES RAMSEY SPEER, OF PITTSBURG, AND GEORGE H. HARVEY, OF GLENFIELD, PENNSYLVANIA, ASSIGNORS TO BROWNSVILLE GLASS COMPANY, OF PITTSBURG, PENNSYLVANIA, A CORPORATION OF PENNSYLVANIA.

MANUFACTURE OF GLASS.

No. 812,894.     Specification of Letters Patent.     Patented Feb. 20, 1906.

Application filed April 1, 1905. Serial No. 253,258.

*To all whom it may concern:*

Be it known that we, JAMES RAMSEY SPEER, residing at Pittsburg, and GEORGE H. HARVEY, residing at Glenfield, Allegheny county, and State of Pennsylvania, citizens of the United States, have invented or discovered new and useful Improvements in the Manufacture of Glass, of which the following is a specification.

Our invention relates to the manufacture of hollow articles, such as cylinders, from molten or plastic glass, and has particular reference to means for maintaining any desired distance between the surface of the glass and the mouth of the inlet which supplies air or other gaseous element to the interior of the cylinders during their drawing. The pot may be provided, if desired, with an opening to permit the introduction of air therethrough into the cylinder and also in addition, if preferred, a duct therein to draw off the air during the formation of the cylinder.

Other points of novelty will appear in the detailed description and the claims.

In the drawings forming a part hereof, Figure 1 represents, partly in elevation and partly in vertical section, one of the many forms which our invention may assume, portions being broken away. Fig. 2 is a similar view of another form of our invention, the motor and some of its connections being omitted.

Referring now to Fig. 1, 1 represents a standard or mast which guides the carriage or arm 2 in its vertical movements. The outer end of the carriage supports the drawing-tool 3, mounted on the removable pivot 4 and having at its lower end a bait 3. Supported in the brackets 5 on the mast 1 and in the step 6 is the vertical screw 7, in threaded engagement with the carriage 2. The screw may be driven in various ways, or other raising and lowering means may be used for the carriage. We have illustrated the screw 7 as driven by the motor 8, having the pinion 9 meshing with the spur-gear 10 on the shaft 11, which through the worm 12 thereon drives the worm-wheel 13, secured to the screw-shaft. 14 represents a furnace provided with the burners 15 or other heating means and having the top opening 16 beneath the tool 3. At opposite sides of this opening we mount on trunnions the two pots 17 and 18, having annular cavities 19 to contain the glass to be drawn and the bosses 20 in the cavities. The trunnions of each pot are at one end, so that the pots may be swung downwardly, as shown by the pot 18. Extending through the bottom of each pot and the boss therein is the opening 21, the upper end thereof being larger than the lower end, the larger end being connected to the duct or passage 22, leading through the body of the pot and one of the trunnions. An air or gas inlet pipe 23 extends through the bottom of the furnace and the opening 21, which latter it preferably fits closely, leaving an annular space 24 between the pipe and the large part of the opening 21. The pipe 23 has a deflector 25 to direct the air toward the junction of the cylinder and the glass in the pot. The screw-shaft is provided with the pinion 26, in mesh with the gear-wheel 27, which drives the gear-wheel 28, sleeved loosely on the screw 29, secured to the tube 23 below the furnace 14. The wheel 28 carries a catch or nut section 30, which is preferably urged by a spring into engagement with the screw 29. The catch has a vertical finger 31 standing in the path of the ring-cam 32, operated by the lever 33, pivoted at 34. The cam-ring 32 surrounds the pipe 23 and has its outer face or rim tapering downwardly, so that when the cam is forced down it withdraws the catch 30 from the screw 29 and holds it withdrawn without interfering with the screw or the pipe. After the catch has been withdrawn from the screw 29 the pipe 23 can be withdrawn from the pot by means of the lever 35, which has one end lying between the collars 36 on the pipe. The lever is pivoted at 37 and has the operating-handle 38. The pots may be held with their upper surfaces close against the furnace-top by any means, as the bar 39, extending through the furnace into contact with the bottoms thereof.

The pot 17 being supplied with glass, as shown, the drawing-tool is by the motor 8 lowered until its lower edge dips into the glass. When the glass has sufficiently adhered thereto, the screw is rotated in a reverse direction by the motor, causing a hollow body to be drawn in an obvious manner, air or its equivalent being supplied to the interior of the body during the drawing operation by means of the pipe 23. The air escapes through the duct 22, if the latter be desired. As the cylinder is drawn the surface of the glass in the pot is lowered, so that the air would be directed by the deflector 25 at relatively higher positions above the said surface, if our improvement be not used. We maintain a constant or desired distance between the upper end of the pipe 23 and the surface of the glass in the pot, preferably by means of the screw 29, which is slowly lowered during the drawing operation. The gearing should be proportioned to maintain the ratio of speeds desired between the carriage 2 and the tube 23, or any variable-speed gears may be used to accelerate or retard either of the speeds. As soon as the drawing operation has been completed the cylinder is severed from the glass in the pot and preferably swung over on its side on the pivot 4, the carriage 2 being at the same time lowered gradually. The lever 33 is then operated to cause the cam-ring 32 to withdraw the catch 30 from the screw 29. Then the lever 35 is actuated to withdraw the tube 23 from the pot, which is then swung into a vertical position to be reheated. The other pot is then swung into horizontal position and charged with glass. The levers 35 and 33 are actuated to insert the tube 23 through the pot and to connect the catch with the screw 29. The drawing of another cylinder proceeds as described.

Referring now to Fig. 2, 40 represents a pot containing glass to be drawn into a cylinder. The pot is shown sitting in an opening in the top of the furnace 41. The drawing-tool consists of the upper portion 42, to which is secured the lower annular portion 43. Slidably arranged in an opening in the top of the drawing-tool is the double depending tube, consisting of an outer tube 44, which fits the said opening in the tool. Within the tube 44 is the tube 45, having just below its lower end the conical deflector 46 and above the deflector 46 a parallel deflector 47. The latter deflector is secured to the tube 45, so that the air escaping therefrom passes between it and the deflector 46 toward the junction of the glass cylinder being drawn and the surface of the glass in the pot. Above the deflector 47 and secured to the tube 44 is the deflector 48, preferably parallel to the other deflectors, which guides the air up through the tube 44. The tubes 44 and 45 are secured together by the spacers 49, and the tube 45 is continued through the screw 50 and over the sheaves 51 to a place within reach of the operator or to a winding-drum. The continuation of the tube 45 beyond the screw 50 is flexible and is marked 52. The screw 7, driven in any well-known manner, drives, through the gears 53 and 54, the gear 55, loosely sleeved on the screw 50. The gear 55 has a catch 56, which may be actuated the same as the catch 30 or by hand or otherwise. The screw 50, as well as the screw 29, is prevented from rotation by means of the square portion 57 of the inlet-tube being in a corresponding guide 58.

During the drawing operation with the apparatus of Fig. 2 the tubes 44 and 45 will be lowered to the desired distance above the surface of the glass in the pot. As the cylinder is drawn the tubes are lowered at such a rate as to maintain the desired distance between the lower ends of the tubes and the surface of molten or plastic glass. When the cylinder has been completed, the tubes 44 and 45 are drawn upwardly by pulling the tube 52 after the catch has been withdrawn from the screw 50 until their lower ends are within the cavity of the tool. The cylinder can then be removed from above the pot.

We do not desire to be restricted to any of the details shown and described, as various modifications may be employed which will embody the principles of our invention. For example, the direction of the air through the tubes may be reversed or the outlet may be omitted or closed, if found desirable. Other parts may be omitted or supplied or modified, and still the principles of our invention will not be sacrificed. We also desire protection so far as our invention is applicable to the manufacture of flats.

Having described our invention, we claim—

1. In the manufacture of hollow glassware, means independent of the molten glass for cooling the glass in the neighborhood of the drawing zone, and means for lowering the cooling means in unison with the lowering of the molten glass in the receptacle therefor during the drawing operation.

2. In the manufacture of hollow glassware, means for delivering a gaseous fluid within the hollow ware in the neighborhood of the drawing zone and means for lowering the delivering means during the drawing operation.

3. In the manufacture of hollow glass, means within the hollow glass for cooling the glass in the neighborhood of the drawing zone, and means for producing a relative movement of the glass-container and the cooling means during the drawing operation.

4. In the manufacture of hollow glass articles, means for supplying a gaseous pressure within the article during the drawing operation and means for simultaneously lowering the said supplying means.

5. In the manufacture of hollow glass articles, means for drawing the glass, means for supplying a gaseous pressure within the article during the drawing operation, means for lowering the said supplying means at a desired rate relative to the rate of travel of the drawing means.

6. In the manufacture of glass, a swinging pot, having an opening and means for admitting a fluid through said opening but out of contact with the molten glass and means for swinging the pot so that its mouth will be sufficiently low to drain the same.

7. In the manufacture of glass, a swinging pot having an opening, means for admitting a fluid through said opening and means for removing said first means.

8. In the manufacture of hollow glass articles a pipe to conduct fluid to the interior thereof, means for lowering the pipe, said means including a detachable connection, and means for withdrawing the detachable connection.

9. In the manufacture of hollow glass articles, a pipe to conduct fluid to the interior thereof, means for lowering the pipe, said means including a detachable connection, means for withdrawing the detachable connection and a second means for lowering the said pipe.

10. Steps in the process of drawing hollow glassware, which consist in drawing vertically a hollow body directly from the molten glass, causing the level of the glass to change as the drawing progresses and supplying a cooling medium within the hollow ware at a substantially fixed distance from the drawing zone.

11. Steps in the process of drawing hollow glass which consist in drawing vertically a hollow body directly from the molten glass, causing a gaseous fluid to be delivered within and against the same at a substantially fixed distance from the drawing zone.

12. Steps in the process of drawing hollow glass articles which consist in drawing vertically a hollow body directly from the molten glass, supplying a gas in the neighborhood of the drawing zone, within the hollow glass and simultaneously lowering the supplying means.

Signed at Pittsburg, Pennsylvania, this 29th day of March, A. D. 1905.

J. RAMSEY SPEER.
GEORGE H. HARVEY.

Witnesses:
F. N. BARBER,
M. A. BUSHMAN.